US006553102B1

(12) United States Patent
Fogg et al.

(10) Patent No.: US 6,553,102 B1
(45) Date of Patent: *Apr. 22, 2003

(54) SYSTEM AND METHOD FOR FULLY INTEGRATING MULTIPLE BUSINESS TELEPHONE SYSTEMS WITH A SINGLE VOICE MAIL SYSTEM

(76) Inventors: Shawn D. T. Fogg, 250 Stone Ridge Dr., East Greenwich, RI (US) 02818; David C. Fogg, 250 Stone Ridge Dr., East Greenwich, RI (US) 02818; Pamela Tripode Fogg, 250 Stone Ridge Dr., East Greenwich, RI (US) 02818

( * ) Notice: Subject to any disclaimer, the term of this patent is extended or adjusted under 35 U.S.C. 154(b) by 0 days.

This patent is subject to a terminal disclaimer.

(21) Appl. No.: 09/196,870

(22) Filed: Nov. 20, 1998

Related U.S. Application Data

(63) Continuation-in-part of application No. 08/761,356, filed on Dec. 6, 1996, now Pat. No. 5,841,839.

(51) Int. Cl.[7] .............................................. H04M 1/64
(52) U.S. Cl. .................. 379/88.25; 379/196; 379/198; 370/401
(58) Field of Search .......................... 379/67.1, 88.22, 379/88.25, 88.28, 198, 196, 88.23, 88.24; 370/401

(56) References Cited

U.S. PATENT DOCUMENTS

| | | | | |
|---|---|---|---|---|
| 4,371,752 A | * | 2/1983 | Matthews et al. | 379/7 |
| 5,255,314 A | * | 10/1993 | Applegate et al. | 379/225 |
| 5,260,990 A | * | 11/1993 | MeLampy et al. | 379/219 |
| 5,475,737 A | * | 12/1995 | Garner et al. | 379/67 |
| 5,515,422 A | * | 5/1996 | MeLampy et al. | 379/67 |
| 5,708,699 A | * | 1/1998 | Concepcion et al. | 379/89 |
| 5,852,652 A | * | 12/1998 | Matsuoka | 379/88 |
| 5,892,764 A | * | 4/1999 | Reimann et al. | 370/401 |

* cited by examiner

Primary Examiner—Fan Tsang
Assistant Examiner—Gerald Gauthier
(74) Attorney, Agent, or Firm—Barlow, Josephs & Holmes, Ltd.

(57) ABSTRACT

An integrated telephone switching apparatus interconnects a plurality a PBX's to a single voice mail system. The apparatus includes a plurality of input ports for accepting calls from the voice mail extensions of different PBX's, a plurality of output ports for directing the calls to the voice mail ports of the voice mail system, and a switching circuit for switching the calls from input ports to the output ports. An internal switching control system selectively cross-connects incoming calls from the input ports to the output ports. The control system receives call information from the PBX's via a digital data connection, or by in-band dial tones, matches each set of call information with an associated call, creates a new set of call information for each of the calls, and supplies the new set of call information to the voice mail system when the call is switched so that the voice mail system can answer the call and play the required greeting. All of the voice mail ports are dynamically allocated during use. The system allows the combined use of both in-band and out-of band PBX's with a single voice mail system, allows the use of a variety of call information protocols between the PBX's and the system, and between the system and the voice mail system, and further allows a variety of integration schemes which provide enhanced functionality to the voice mail system.

16 Claims, 13 Drawing Sheets

SYSTEM AND METHOD FOR FULLY INTEGRATING MULTIPLE BUSINESS TELEPHONE SYSTEMS WITH A SINGLE VOICE MAIL SYSTEM

This is a Continuation-in-part of application Ser. No. 08/761,356, filed Dec. 06, 1996, now U.S. Pat. No. 5,841,839.

BACKGROUND OF THE INVENTION

The instant invention relates generally to telephone exchange systems and telephone voice mail systems, and in particular to an integrated telephone switching apparatus which allows multiple remote and/or local telephone exchange systems, such as private branch exchanges (PBX), key systems, central office switches, and CENTREX systems, to be connected to a single voice mail system with full integration of all telephone exchange systems from all locations.

Telephone exchange systems provide organizations with the ability link a plurality of incoming trunk lines with a plurality of telephone extensions at the organizations premises. As indicated above, there are many different types of telephone exchange systems, including private branch exchanges (PBX's), key systems, central office switching systems, and CENTREX systems which can provide switching capabilities. Numerous PBX systems, key systems, central office switching systems, and CENTREX systems are well known and commercially available from a variety of different vendors. In order to provide continuity within the rest of this specification and the claims, the term PBX will hereinafter be utilized as a generic term to describe a generic telephone exchange system, and it is to be understood that the term PBX is intended to include private branch exchanges as well as key systems, central office switches, CENTREX systems, and other types of telephone exchange systems.

Integration of voice mail systems with PBX systems, key systems, etc. is well known in the art. Integration between a PBX and a voice mail system can generally be defined as the ability to automatically exchange call information between the PBX and voice mail system without user input. More specifically, this exchange of information includes providing the identity of the called party so that the voice mail system can select the proper personal greeting (called party ID), return to operator (dial 0), providing message waiting indicator information back to the PBX (MWI), direct call message retrieval (calling party ID), direct reply to messages left by internal callers, and original called party ID on multiple call forward. In out-of-band integration systems call information from the PBX is provided to the voice mail system by a digital connection between the PBX and the voice mail system. Likewise MWI information flows from the voice mail system back to the PBX through the digital connection. In in-band systems, data is provided to the voice mail system by DTMF tones forwarded with the transferred call. MWI information flows back to an in-band PBX by picking up a predefined extension and dialing a set of DTMF tones back to the PBX. The PBX interprets these tones to light an MWI on the called party extension.

In a typical office telephone exchange system arrangement, the office PBX is directly connected to an associated voice mail system wherein the voice mail system provides voice mail functions for that particular PBX. This is an effective arrangement when a company has only one office with one PBX. However, when a company has more than one location, either locally or remotely, each office PBX is usually provided with an associated voice mail system to serve that particular PBX. In order for the separate voice mail systems to communicate, i.e. to exchange messages, voice messages destined for a remote location are stored in a storage device, such as a hard drive, and at a predetermined time, for example once each hour, the voice mail system will connect with the remote voice mail system and transfer the messages. Although the conventional arrangement of providing separate voice mail systems for each PBX functions effectively, there are many obvious disadvantages to such an arrangement.

The first obvious disadvantage is the cost of providing separate voice mail systems for each location. These costs can be broken down into equipment, service, maintenance, management, and connection costs. With regard to equipment, each separate voice mail system is expensive, and accordingly, the costs for providing each location with its own dedicated voice mail system can run into hundreds of thousands of dollars for a company with four or more offices. Included in the initial equipment expenditures is the cost of purchasing multiple power systems to provide both redundant power and back-up power to the voice mail systems in the event of power equipment failure or power outages. Further adding the equipment costs is the cost of spare parts which are usually maintained at each separate site to effect quick repairs in the event of a system failure. Still further adding the already high cost of separate systems is the fact that each separate system must be oversized to accommodate peak usage at that particular location. Accordingly, each location is provided with more storage space and more accessible voice ports than is necessary if the system were fully integrated. With regard to service and interconnection costs, each location carries maintenance costs, service contracts, the costs of maintaining local system administrators to run the separate systems, and inter-system interconnection charges to exchange messages between locations.

Another obvious disadvantages is that voice mail messages bound for off-site locations are not immediately available to the person receiving the message. As indicated above, these message may be parked in a storage device for an hour or more before they are transferred to the remote voice mail system.

SUMMARY OF THE INVENTION

The instant invention provides an integrated telephone switching apparatus which is operative for interconnecting a plurality a private branch exchanges, and/or key systems, and/or central office switches, and/or CENTREX systems (hereinafter PBX's) to a single voice mail system regardless of manufacturer, or location, or communications protocol. In general, the switching apparatus provides a unique switching arrangement for accepting incoming calls and call information from a plurality of voice mail extensions of a plurality of different PBX's, and for performing cross-connection of all of those calls to a single voice mail system.

More specifically, the integrated switching apparatus includes a plurality of input ports for accepting calls from the voice mail extensions of different PBX's, a plurality of output ports for directing the calls to a plurality of voice ports of a voice mail system, and a switching circuit for switching the calls from input ports to the output ports. Voice mail extensions can be connected to the integrated switching apparatus by a variety of different means, including but not limited-to voice over data multiplexers for remote PBX's, direct connection for local (on premise) PBX's, and off premise extensions (OPX's) for local (off-site) PBX's. The switching apparatus further includes a switching control system for controlling the switching of the incoming calls from the input ports to the output ports. The switching control system receives call information from the different PBX's, either via a separate digital data connection or by DTMF means, matches each set of call information with an associated call, creates a new set of call information for each of the calls when each of the calls is switched from one of the input ports to one of the output ports, and supplies the new set of call information to the voice mail system when the call is switched so that the voice mail system can answer the call and play the required greeting. The key operating feature of the switching control system is the fact that all of the voice mail ports are dynamically allocated during use. In other words, each voice mail port is selected in rotating sequence during operation, rather than having a predetermined order of preference. By dynamically allocating the voice mail ports, the number of voice mail ports can be reduced to about half the number of incoming voice mail extensions. This is a dramatic reduction in the number of voice mail ports over the one to one allocation system used in the prior art systems, and substantially reduces the overall cost of purchase and maintenance during operation. Still further, the switching control system recognizes different call protocols, including SMDI and various DTMF formats, and automatically creates a new call information data packet in a predetermined protocol for each call for use by the voice mail system.

Accordingly, it is a primary object of the instant invention to: provide an integrated telephone switching apparatus which enables multiple PBX's to be connected to a single voice mail system; the provision of an integrated telephone switching apparatus wherein the number of voice mail ports is about half of the incoming voice mail extensions; the provision of an integrated telephone switching apparatus having a switching control system that dynamically allocates the voice mail ports during operation; and the provision of an integrated telephone switching apparatus having a switching control system that recognizes and receives a plurality of different call information protocols, and which creates a new call information data packet in a predetermined protocol.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
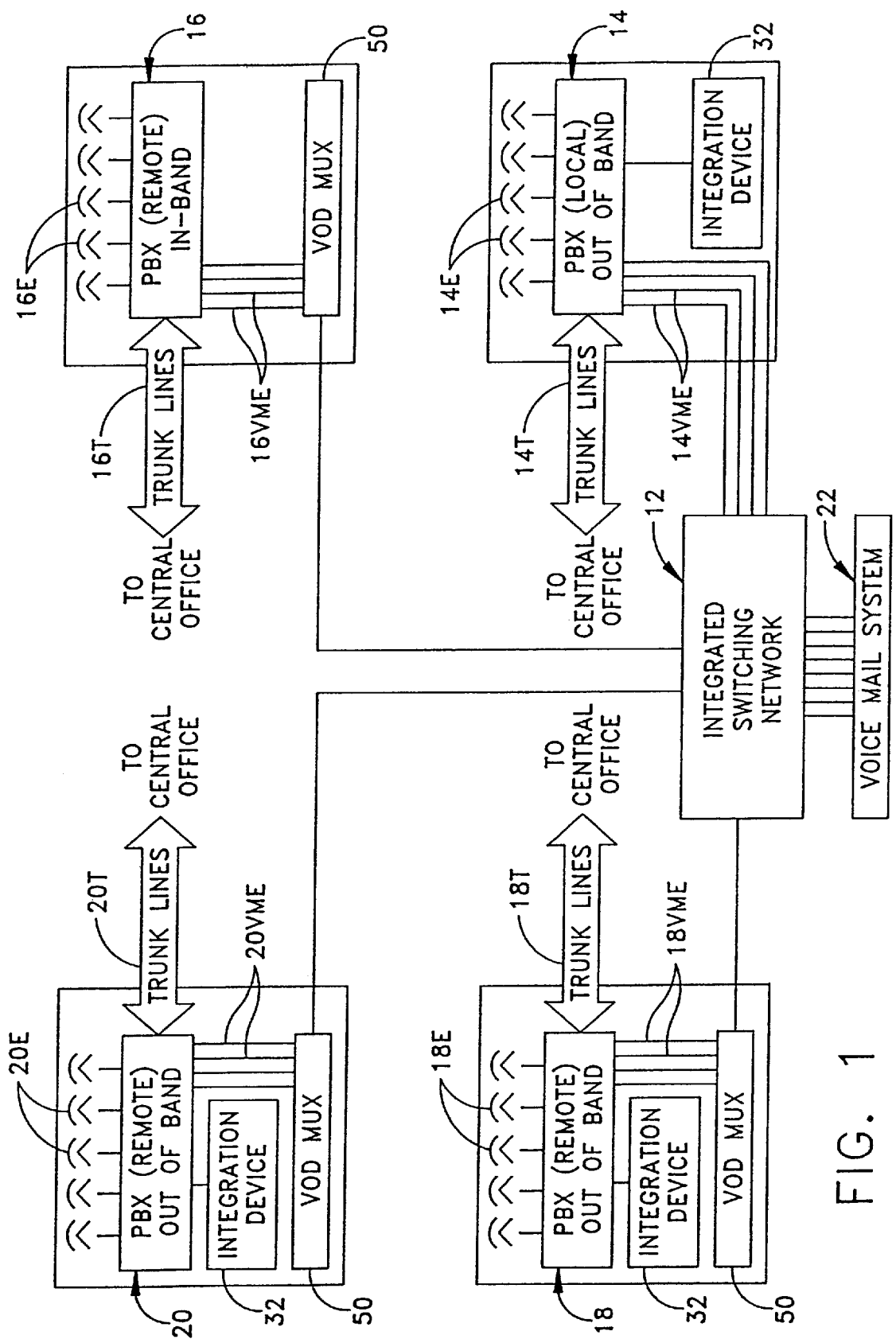
FIG. 1 is a schematic block diagram of an integrated telephone system incorporating the switching apparatus of the instant invention.
Figure 1A:
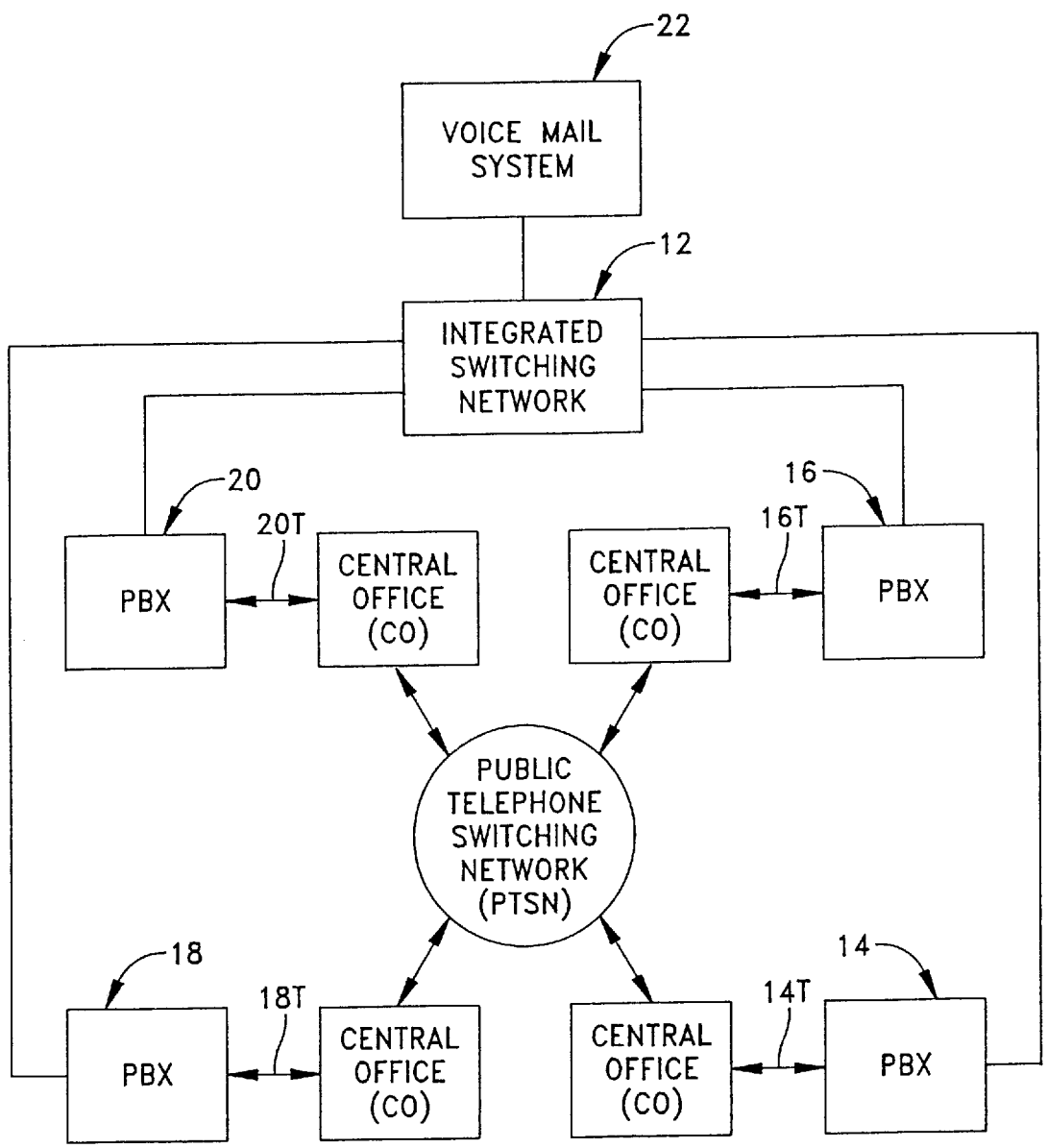
FIG. 1A is a schematic block diagram of the location of the integrated telephone switching network relative to the public telephone switching networks and the central offices.

Referring now to the drawings, an integrated telephone switching and voice mail network incorporating the integrated switching apparatus of the instant invention is illustrated and generally indicated at 10 in FIG. 1, while the integrated switching apparatus of the instant invention is generally indicated at 12 in the drawings. As will hereinafter be more fully described, the apparatus 12 is generally operative for interconnecting a plurality a private branch exchanges (PBX's) generally indicated at 14, 16, 18, and 20 respectively, to a single voice mail system generally indicated at 22.

As indicated in the Background portion of this specification, the term PBX is intended to generally define a discrete telephone exchange system, including, but not limited to private branch exchanges, key systems, central office switching systems, and CENTREX systems, each of which serves a separate office. For example, a PBX 14 serving a Boston, Mass. office, a PBX 16 serving a Chicago, Ill., office, a PBX 18 serving a Providence, R.I. office, and a PBX 20 serving a Denver office. Each PBX 14, 16, 18, 20 includes a plurality of incoming trunk lines 14T, 16T, 18T, and 20T respectively, which connect the respective PBX with an associated central office and in turn to a public or private telephone network (PSTN). Each PBX further includes multiple telephone extensions 14E, 16E, 18E, and 20E respectively, at the location premises. Each PBX is utilized in connection with the voice mail system 22, and therefore each PBX further includes voice mail extensions 14VME, 16VME, 18VME, and 20VME respectively, to forward calls the integrated switching apparatus 12 which in turn connects to the voice mail ports of the voice mail system 22. The PBX's 14, 16, 18, and 20 generally provide the functions of switching calls from the incoming trunk lines 14T, 16T, 18T, and 20T to the telephone extensions 14E, 16E, 18E, and 20E, and switching calls from extension to extension or from extension to outgoing trunk line. Many types of PBX's also include what are known as digital telephone extensions which are utilized to provide call information via an integration device to a voice mail system, attendant telephone, or for other purposes.

Figure 3:
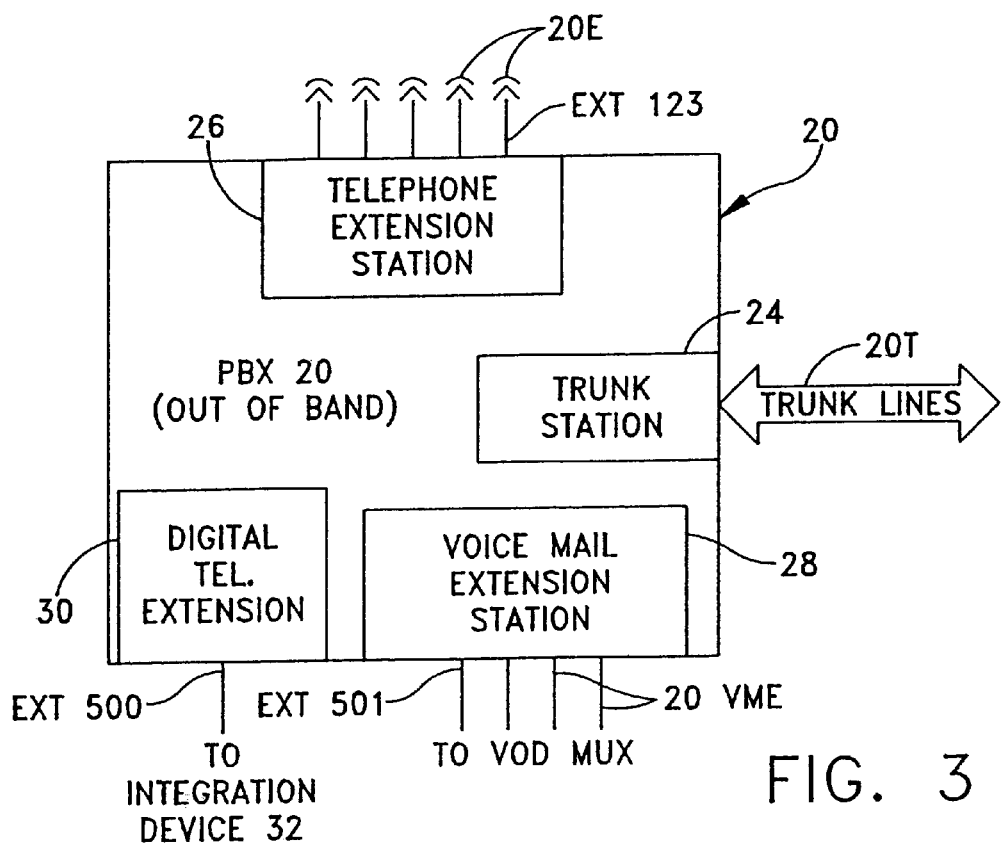
FIG. 3 is an enlarged block diagram of an out-of-band PBX as utilized within the integrated telephone network shown in FIG. 1.

Referring to FIG. 3, a more detailed configuration of PBX 20 is illustrated. PBX 20 comprises an out-of-band PBX which 20 includes a trunk station 24 for trunk lines 20T, a first telephone extension station 26 for the plurality of telephone extensions 20E, a second telephone extension station 28 for the voice mail extensions 20VME, and a digital telephone extension 30. As will be described hereinbelow, the digital telephone extension is connected to an integration device 32, such as a VoiceBridge Series II integration module, as manufactured by Voice Technologies Group, Buffalo, N.Y., to provide call information for out-of-band call integration with the switching apparatus 12. It is noted that PBX 14 and PBX 18 also include a digital telephone extension, and integration devices 32 although they are not specifically illustrated herein. The VoiceBridge device may extract call information, such as calling party, called party extension number, ring no answer codes, busy codes, etc., from the respective PBX and provides an SMDI data stream to identify the call to a voice mail system for use in processing the call through. the voice mail system. While the VoiceBridge SMDI call protocol is indicated as the preferred arrangement for the described system, it is to be understood that the present arrangement can be adapted to deal with other call protocols and provide the same level of effectiveness.

Figure 4:
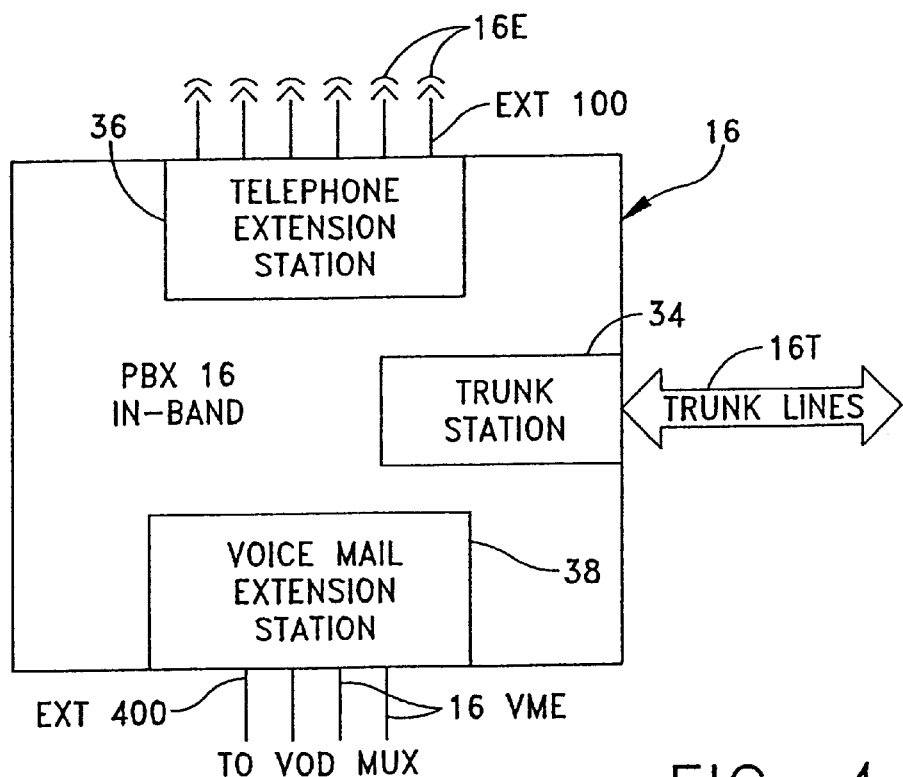
FIG. 4 is an enlarged block diagram of an in-band PBX as utilized within the integrated telephone network shown in FIG. 1.

Referring to FIG. 4, the detailed configuration of PBX 16 of the instant system is illustrated. PBX 16 includes a trunk station 34 for trunk lines 16T, a first telephone extension station 36 for interfacing with telephone extensions 16E, and a second telephone extension station 38 for voice mail extensions 16VME. Notably missing from PBX 16 is the digital telephone extension. PBX 16 communicates with the integrated switching apparatus 12 in what is commonly referred to a in-band integration mode wherein call information is provided by DTMF tones generated by PBX 16 and attached to the call signal when output through the voice mail extension 16VME.

The voice mail system 22 comprises a conventional out-of-band voice mail system well known to those skilled in the art. While an out-of-band voice mail system is described herein, the present system could be equally effective using an in-band voice mail system. In such a system, the voice mail system 22 would communicate with the apparatus 12 using DTMF tones. The voice mail system functions in a completely normal manner and simply views the switching apparatus 12 as a PBX using out-of-band signaling protocols and/or in-band protocols.

Figure 2:
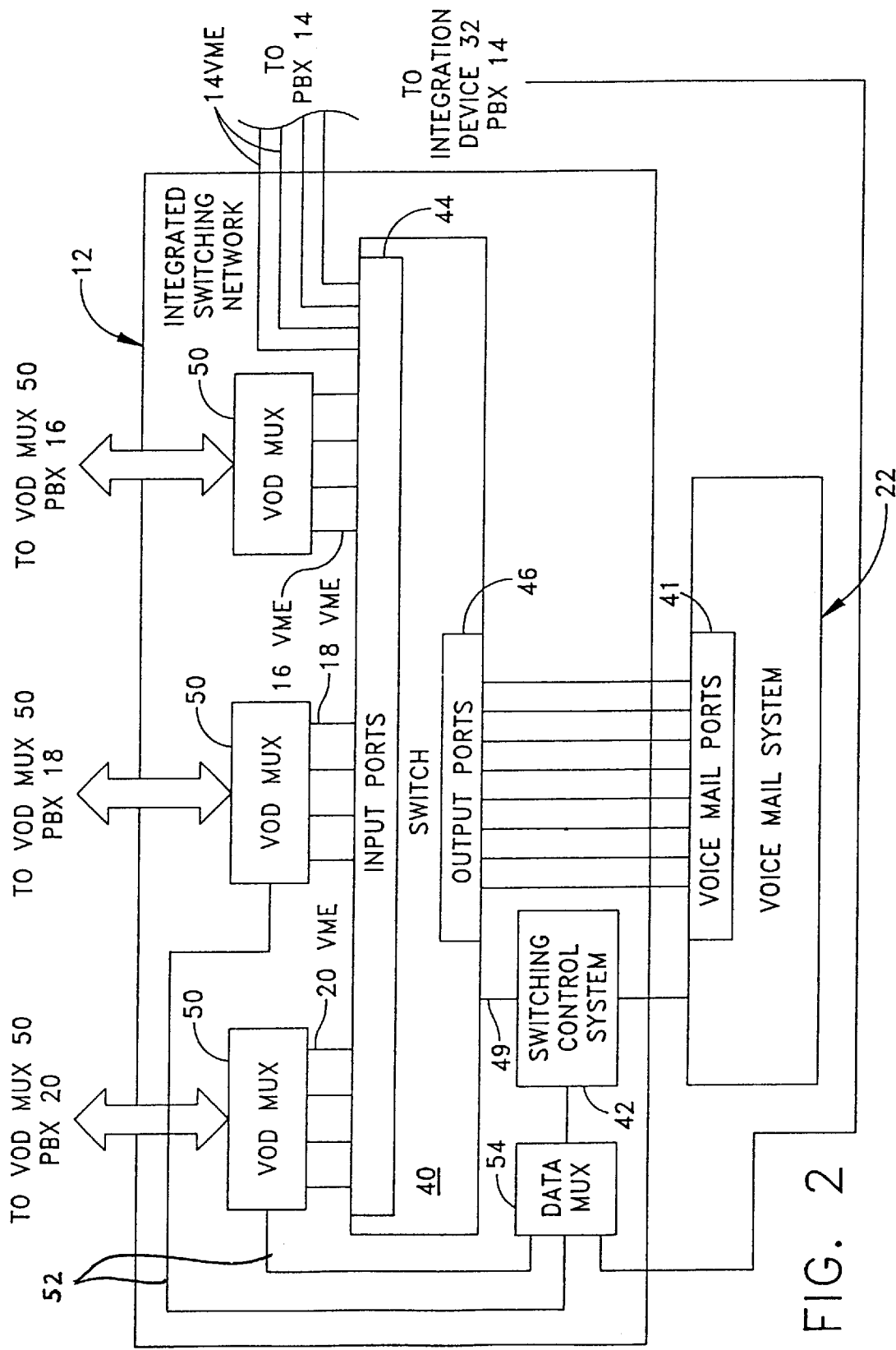
FIG. 2 is an enlarged block diagram of the integrated switching apparatus of the instant invention.
Figure 5:
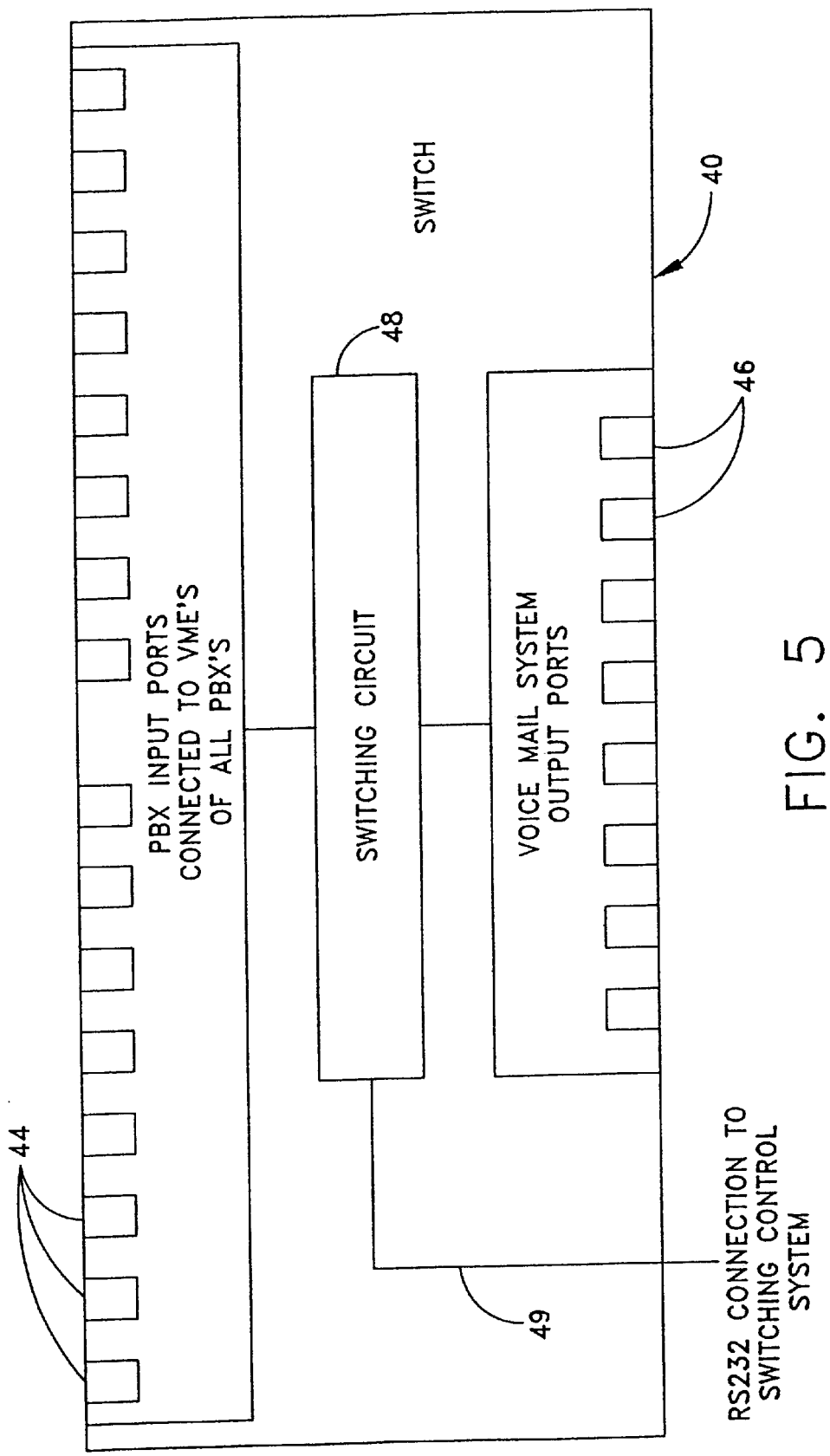
FIG. 5 is an enlarged block diagram of the switching device of the instant invention.

Turning now to FIGS. 2 and 5, the apparatus 12 includes a switching assembly generally indicated at 40 which is operative for interconnecting the voice mail extensions 14VME, 16VME, 18VME and 20VME to the voice mail ports 41 of the voice mail system 22, and further includes a switching control system 42 (host computer) for controlling cross-connection of the calls from voice mail extensions 14VME, 16VME, 18VME and 20VME to the voice mail ports 41 of the voice mail system 22. More specifically, the switching assembly 40 comprises a plurality of input ports 44 for receiving connections from the various voice mail extensions 14VME, 16VME, 18VME, AND 20VME, a plurality of output ports 46 for directing the calls to the voice mail ports 41 of the voice mail system 22, and a switching circuit 48 for cross-connecting calls from the input ports 44 to the output ports 46. There are approximately twice as many input ports 44 as output ports 46. The significance of the two-to-one ratio will be described in a later portion of the specification. The switching control system 42 is connected to the switch circuit 48 by an RS232 connection 49 for controlling cross-connection of the calls from the input ports 44 to the output ports 46, as well as the voice mail system 22 to provide an exchange of out-of-band call information. In an in-band only voice-mail system, as mentioned above, there would be no need for the RS-232 line (49) to communicate with the voice mail system since call information is exchanged using DTMF tones forwarded directly through the voice mail extensions. Turning back to the out-of-band example, the switching control system 42 preferably interacts and exchanges information with the voice mail 22 system using an SMDI protocol. However, communication between the switching apparatus 40 and the voice mail system 22 may be accomplished in any of a variety of other out-of-band protocols.

In describing the overall configuration of the present integrated telephone and voice mail system 10, it is noted that PBX 14, integrated switching apparatus 12, and voice mail system 22 are all located at a common facility. In this regard, the voice mail extensions 14VME of PBX 14 are directly coupled to the input 44 ports of the switching apparatus 40 on a one-to-one correspondence. In contrast, PBX 16, PBX 18 and PBX 20 are located at remote locations, and accordingly, the voice mail extensions 16VME, 18VME, and 20VME, as well as the digital data line from the integration devices 32 (PBX 18 and PBX 20), are coupled to the apparatus 12 through voice over data multiplexers 50, one of which is located at the remote location, and the other of which is located at the apparatus 12 (See FIG. 2). PBX 16 is an in-band PBX and does not include an integration device. It is also contemplated that other voice over data communication technologies, such as frame relay, or TCP/IP (Transmission Control Protocol/Internet Protocol) could be utilized to provide the same functionality. When the multiplexed data streams enter the apparatus 12, they are separated out into the different extensions, and into their associated digital data streams. The multiple outgoing digital data lines 52 are then multiplexed into a single data stream in a data multiplexor 54 and fed directly into the switching control system 42 for processing. The data line from integration device 32 of PBX 14 is also connected directly into the data mux 54.

Figure 6:
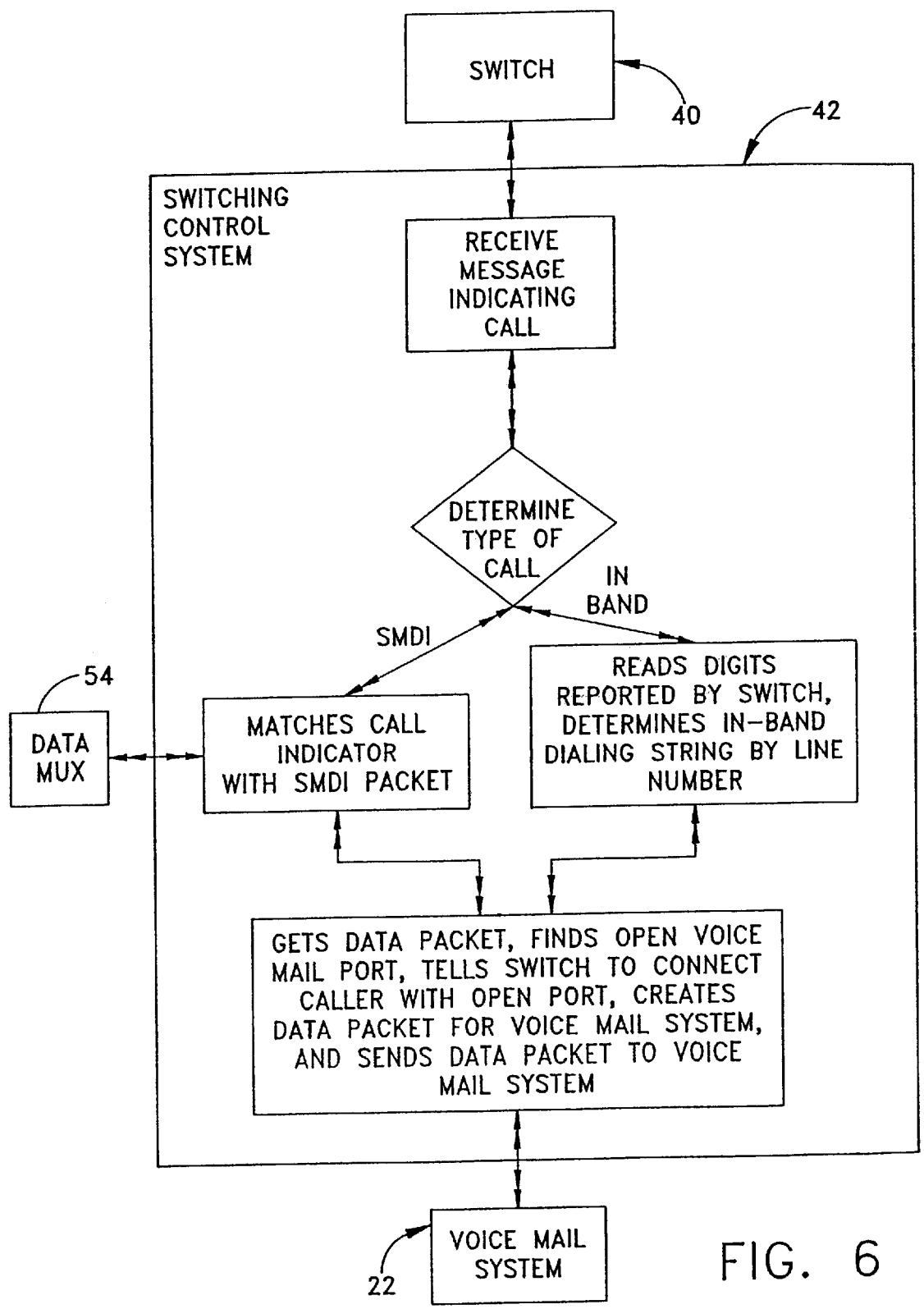
FIG. 6 is a flow diagram of how the switching control system receives and processes data, and routes calls through the integrated switch.

Referring to FIGS. 5 and 6, in general operation of the apparatus 12, the switch 40 receives an incoming call from one of the voice mail extensions VME's connected to one of the input ports 44, while an associated set of call information is provided to the switching control system 42. If the call is from an out-of-band PBX, an associated set of call information is also received by the data mux 54 and sent to the switching control system 42. If the call is from an in-band PBX, the switch 40 collects the in-band DTMF digits and reports the call information to the switching control system 42. The switching control system 42 then searches for the next available voice mail port 46 and creates a new SMDI data packet which substitutes for the original set of call information. The new data packet has the new available voice mail port information as well as the original call information. If no call information is provided, the switching control system 42 substitutes a default set of call information based on which input port 44 the call is received from. In other words, the switching control system 42 recognizes which PBX the call cam from by which input port 44 receives the call, and the switching control system is able to provide information specific to that PBX. The switching control system 42 then send the new data packet to the voice mail system 22 and cross-connects the incoming call to the allocated voice mail port 46. The voice mail system 22 then plays the appropriate greeting, records a message and disconnects.

One of the key aspects to operation of the present apparatus 10 is that the voice mail ports, i.e. output ports 46 are dynamically allocated so that the voice mail system 22 does not need to have a one-to-one correspondence with the voice mail extensions VME's. In other words, each voice mail port is selected in a rotating sequence during operation, rather than having a priority order of preference. Any incoming input port 44 can be cross-connected at any given time to any voice mail port 46 for complete dynamic port allocation of the voice mail system 22. By dynamically allocating the voice mail ports, the number of voice mail ports can be reduced to about half the number of incoming voice mail extensions (VME's). This is a dramatic reduction in the number of voice mail ports over the one-to-one allocation system used in the prior art systems, and substantially reduces the overall cost of purchase and maintenance of the voice mail system 22 during operation. It is further noted that if all of the voice mail ports are ever busy, the switching control system 42 automatically places incoming calls in a queue for handling in the order received.

The apparatus 12 also has the ability to handle Message Waiting Indicators (MWI) produced by the voice mail system 22. For example, in an out-of-band band voice mail system, after disconnecting from a call, the voice mail system 22 will produce an SMDI information packet to send back to the switching control system 42 to turn on the MWI on the proper PBX to indicate that a particular extension has received a message. When the PBX is an out-of-band PBX, the MWI data packet is routed back through the switching control system 42 to the data mux 54 to the appropriate PBX which recognizes the data packet and turns on the MWI. When the PBX is an in-band PBX, the switching control system 42 selects a specific predetermined port connected to the proper PBX, picks up the port (goes off hook) and plays selected DTMF tones to the PBX which the in-band PBX interprets to mean to turn on the MWI for the called extension. Similar functions turn the MWI off when messages are retrieved. On the other hand, in an in-band voice mail system, the voice mail system will select a specific predetermined port connected to the system 12, picks up the port (goes off hook) and plays selected DTMF tones to the system which the system interprets to mean to turn on the MWI for a particular extension. When the PBX is an out-of-band PBX, the system creates an MWI data packet which is routed back through the switching control system 42 to the data mux 54 to the appropriate PBX which recognizes the data packet and turns on the MWI. When the PBX is an in-band PBX, the switching control system 42 selects a specific predetermined port connected to the proper PBX, picks up the port (goes off hook) and plays selected DTMF tones to the PBX which the in-band PBX interprets to mean to turn on the MWI for the called extension. By utilizing an internal database, the switching control system 42 has the capability of handling multiple different DTMF formats at the same time which may be necessary for different in-band PBX's.

By using several additional "replacement" databases, the system 12 can also provide a variety of other integration functions which are far superior to existing systems. For example, the system 12 can include several replacement databases which allow a person with a multiple location company to have a single voice mail box fully integrated for different extensions at different company locations, as well as MWI to each different extension. In this embodiment, the system 12 takes calls information from the PBX, and looks through an "extension" replacement database to see if the mailbox number, i.e. a combination of PBX identification and station extension, in the call information packet is contained in the database. If, yes, the system then utilizes the replacement information to access the correct mailbox (See Replacement Table 1 below). The table simply routes all of that persons extensions to a single mail box. This effectively allows the system to answer with the same mailbox for multiple extensions. On the MWI side, there is an "MWI" replacement database having a list of all extensions at all locations which the person needs to have activated or deactivated. The system takes the MWI call packet from the voice mail system and looks through the MWI replacement database to see if the MWI extension number is contained in the database. If yes, the system will then utilize the replacement information to create multiple MWI packets for the multiple extensions indicated (See Replacement Table 2 below). All of the new MWI packets are then intepreted by the switching control system, and distributed directly to each of the out-of-band PBX's to activate or deactivate the MWI in all locations needed. The MWI packets for the in-band PBX's are converted to DTMF format and the system goes off-hook to dial the proper MWI tones. The system is functional for both in-band and out-of-band PBX's and voice mail systems. In addition, the replacement database also can substitute a different call type if required, i.e. busy/no answer/direct/forward all calls, for whatever information was sent in the original call packet. (See FIG. 8A).

REPLACEMENT TABLE 1

| Incoming Ext. Mailbox | Outgoing Replacement Mailbox | Call Type |
| --- | --- | --- |
| 1111111 | 1111111 | A |
| 2222222 | 1111111 | D |
| 3333333 | 1111111 | B |
| 4444444 | 1111111 | N |
| 1111234 | 1111234 | A |
| 2222345 | 1111234 | D |
| 3333456 | 1111234 | B |
| 4444567 | 1111234 | N |

A - Forward all calls
D - Direct
B - Busy
N - No answer
0 - Change Nothing

REPLACEMENT TABLE 2

| Incoming MWI Extension | Outgoing MWI Extension |
| --- | --- |
| 1111111 | 1111111, 2222222, 3333333, 4444444 |
| 1111234 | 1111234, 2222345, 3333456, 4444567 |

The database features of the system 12 also permit the voice mail system 22 to provide Automated-Attendant (AA) functionality to all of the PBX's. In a prior art voice mail system, the AA function is normally handled by the voice mail system by assigning AA functions, i.e. an AA mailbox, as a default for all ports of the voice mail system that are connected to the PBX. Recall that in the prior art systems, there is a one-to-one correspondence of the voice mail extensions to the voice mail ports. When no accompanying call data is received by the voice mail system, the voice mail defaults to an AA mailbox which directs the user to input information. Since the present system 12 does not have a one to one relationship of voice mail input ports, and in fact dynamically allocates the voice mail ports to whichever PBX needs them, another means of providing AA functionality is required. In this regard, each PBX is provided with a default AA mailbox on the voice mail system, and as part of the PBX input port assignment information in the database, the AA mailbox information is provided as a default setting when no data is received. Recall that the system database identifies the input ports assigned to each PBX so that the system 12 knows from which PBX the call is coming. When there is no data provided, the system 12 uses the input port assignment data and default AA mailbox data to create a data packet for the AA function and then cross connects the call to the voice mail system 22 which answers using the default AA mailbox for the associated PBX. Alternatively, in some PBX applications, the PBX sends some data to the voice mail system even for calls that are to be handled as AA calls. Frequently, this information includes a trunk ID which the PBX has programmed in it for each trunk group. In this case, the system can filter the data through a replace database to substitute the correct mailbox information for the existing information and the caller hears the correct AA for the called location. (See FIG. 8B).

The system 12 further still has the ability to complete "park & pick" integration. "Park & Pick" (PP) integration is used for some PBX system that do not lend themselves to other more common types of integration. The physical connections from the PBX to the system 12 are similar to other out-of-band types of integration (such as FIG. 3), in that there is one digital connection and multiple PBX voice mail stations. A park and pick integration means that a call is sent from a busy/not answered extension to a designated digital phone extension on the PBX. However, instead of a digital phone at the end of the extension, there is a park and pick (PP) integration device that takes the call. A park and pick integration device is a known device in the telecommunications field and is available from various vendors. No further discussion of this type of device is believed to be necessary in the context of this application. This PP integration device is connected to the switching control system 42 for communication. The PP integration device and the switching control system 42 then exchange multiple data packets to complete cross-connecting of the call to the voice mail system. Typically, the first packet emanates from the PP device to tell the system 12 that it has a call, usually including the station number being forwarded, i.e. the called party number, or alternatively the station number could come in a later data packet. The system 12 then sends a return data packet back to the PP integration device telling the PP integration device which port (ports 44) is open. Since the system 12 keeps track of all open ports 44, this port will be open to receive the call. The PP integration device then parks the call on the open port via normal PBX commands and sends another data packet to the system 12 to tell the system that it has parked the call and confirms the extension number on which the call is parked, usually including the calling party and called party extension number again. The system 12 then sends a pick message back to the PP integration device and the system answers the port by going off hook on the port. Alternatively, the call could be parked internally on a park extension within the PBX, and when the system 12 picks the call, instructs the PBX to cross-connect the call from the parked extension to the open voice mail extension. The system 12 then creates a data packet from the called party extension information provided by the PP integration device, sends the new data packet to the voice mail system, and cross connects the call to an available voice mail port 41 using the same functionality and commands as with out-of-band integration. MWI set and cancel commands are handled similarly to other previously defined out-of-band MWI except that the system takes the MWI packet from the voice mail system and creates a new MWI packet that is compatible with the PP integration device for MWI activate and cancel commands. (See FIG. 8C).

Access to the voice mail system 22 by users is achieved in the exact same manner as if the voice mail system were dedicated to a single PBX. For example, a user on PBX 18 can simply directly dial the lead voice mail extension on the local switch to access the voice mail system 22. The lead voice mail extension is the digital telephone extension 30 of the PBX. The user may then enter the necessary commands to retrieve messages, and or leave messages for other extensions within the voice mail system 22 as if the PBX were directly connected to the voice mail system 22. In this regard, the switching control system 42 is able to distinguish between the different PBX's by a database, and it has the ability to deal with conflicting extension numbering arrangement by means of pre-number identifiers provided by, for example, the integration devices. For example, in out-of-band integration, the VoiceBridge integration device 32 can be programmed to provide a three digit pre-number identifier so that the apparatus 12 can identify which PBX the call is coming from, and so that it can distinguish between an extension number 101 at one location and another extension 101 at a different location.

Figure 7:
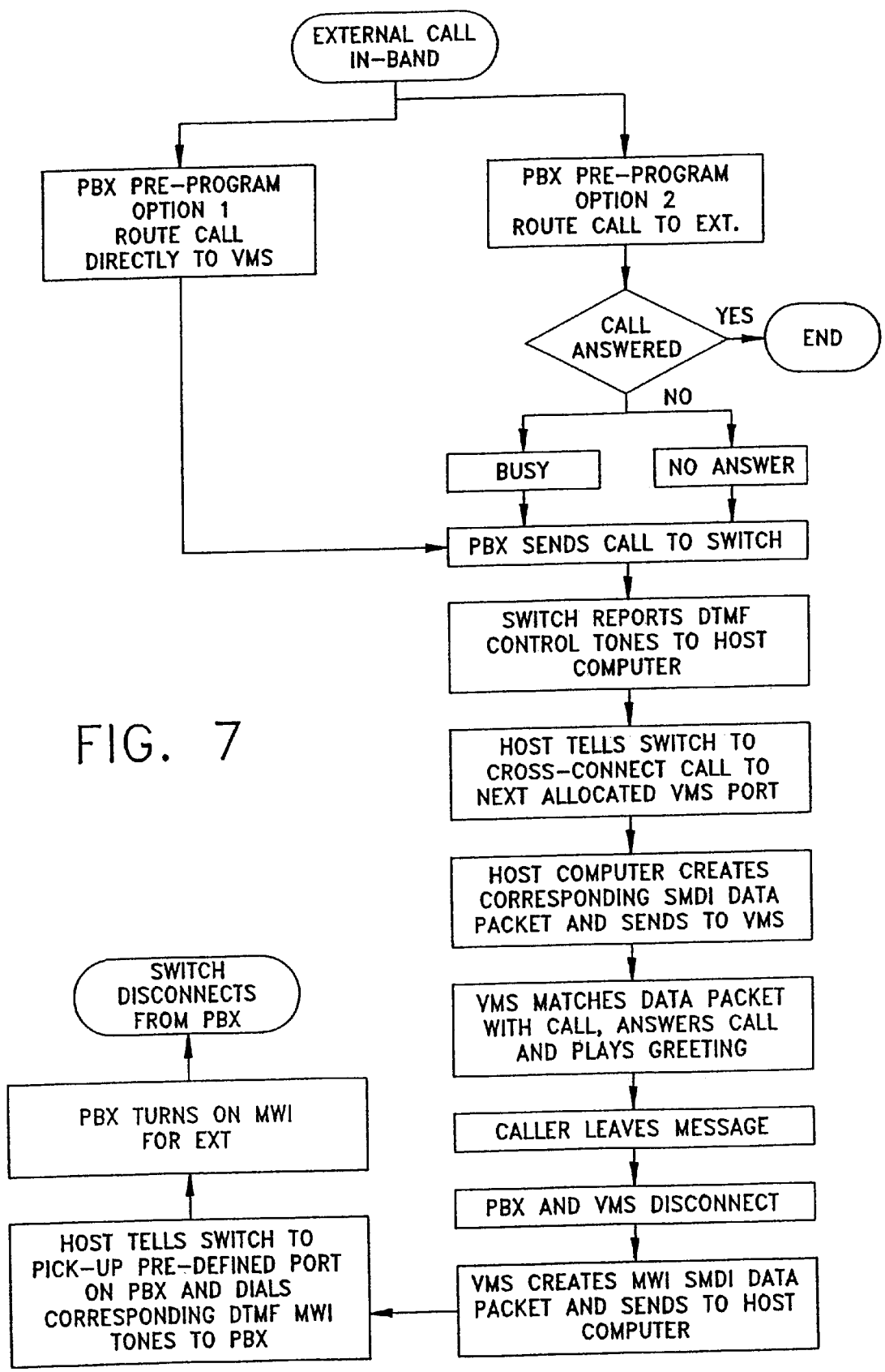
FIG. 7 is a flow diagram showing how the instant telephone switching apparatus handles an external call on an in-band telephone branch exchange.

Referring to FIGS. 4, 5 and 7, a specific example of the handling of an external call to in-band PBX 16 will be described. A caller calls a company wherein PBX 16 receives the call over trunk line 16T (FIG. 4) and the caller enters the extension number of the person being called, for example Ext. 100. According to a pre-programmed command entered by the person being called, the PBX can either forward the call to Ext. 100 or it can immediately forward the call to the lead voice mail extension, for example Ext. 400. If the call is forwarded to the extension (Ext. 100), and is answered, the process is ended before reaching the apparatus 12. If the extension (Ext. 100) is busy or there is no answer, the PBX automatically forwards the call to the lead voice mail extension, for example Ext. 400. In either scenario, when the call is forwarded to the lead voice mail extension (400), the PBX attaches to the call a series of DTMF control tones which identify the extension called, and may also indicate the status of the call, i.e. direct forward, busy, ring no answer. The call is sent out through the remote voice over data multiplexor 50 through a private or public telephone network and into one of several local voice over data multiplexers 50 within the apparatus 12. The call is then sent to one of the input ports 44. Meanwhile, the switching control system 42 reads to DTMF control tones, determines the next available voice mail port 46, and creates an SMDI data packet which it substitutes for the DTMF tones. The SMDI data packet is sent to the voice mail system 22, the call is cross-connected to the allocated voice mail port 46, and the voice mail system 22 answers the call with the appropriate greeting. The caller then leaves message, and PBX 16 and voice mail system 22 disconnect. Thereafter, to light the MWI back on PBX 16, the voice mail system 22 sends an SMDI packet back to the switching control system 42. By means of an internal database, the switching control system 42 knows that PBX 16 is an in-band PBX, and therefore knows that it must pick up the predetermined MWI port and play DTMF tones to light the MWI.

Figure 8:
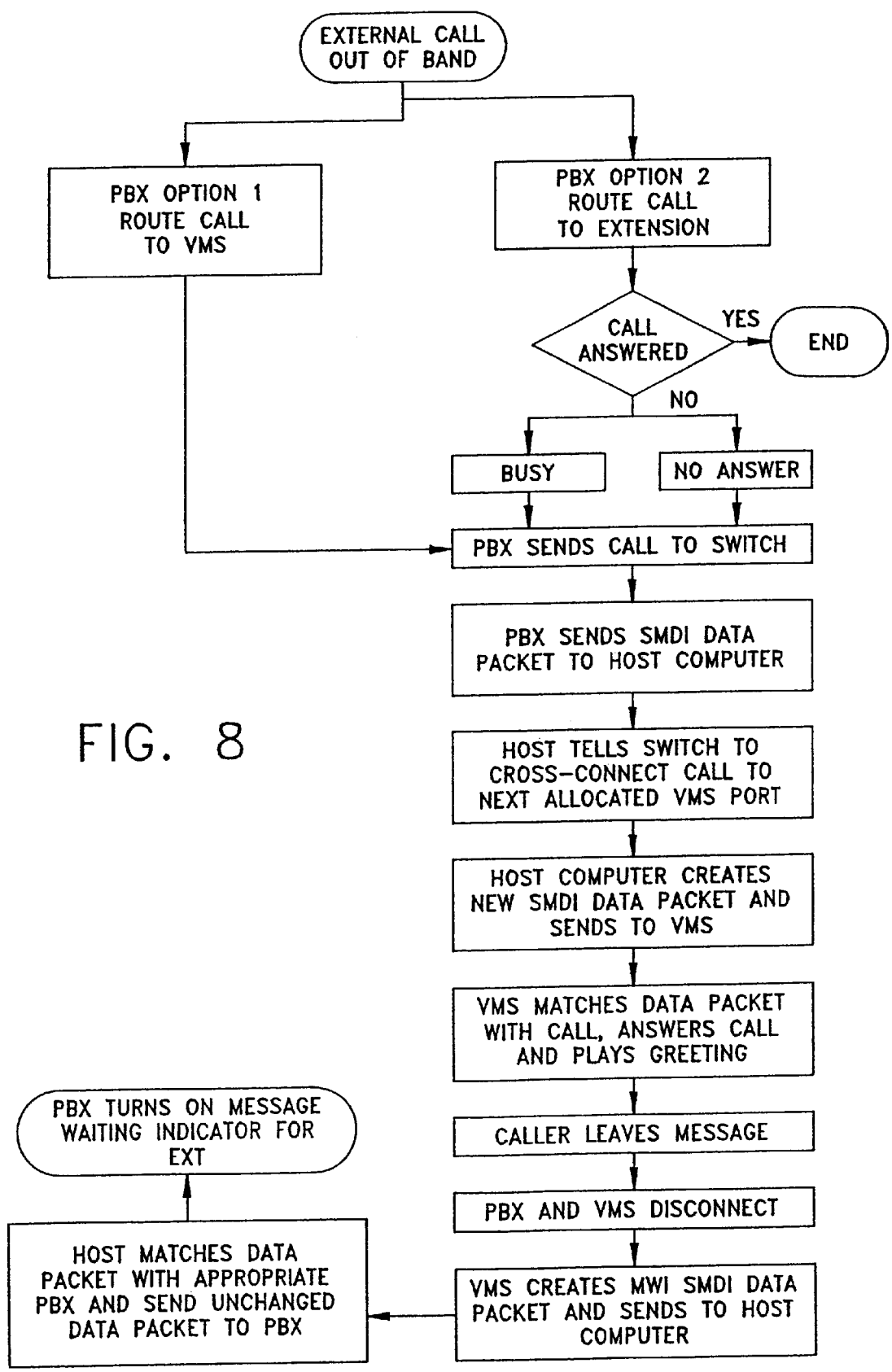
FIG. 8 is a flow diagram showing how the instant telephone switching apparatus handles an external call on an out-of-band telephone branch exchange.
Figure 8A:
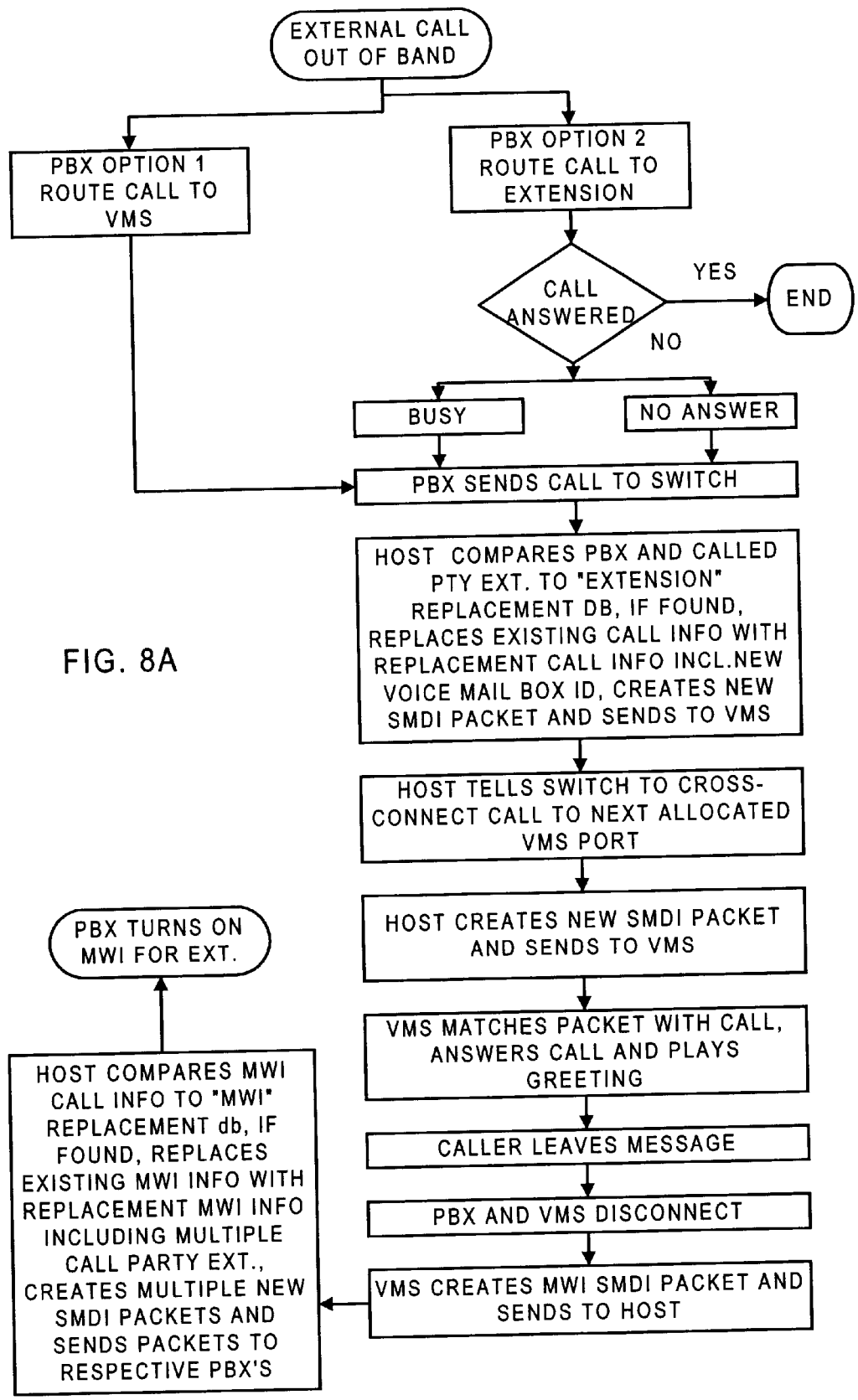
FIG. 8A is a flow diagram showing how the system handles call integration for a multi-extension, multi-MWI single voice mail box application.
Figure 8B:
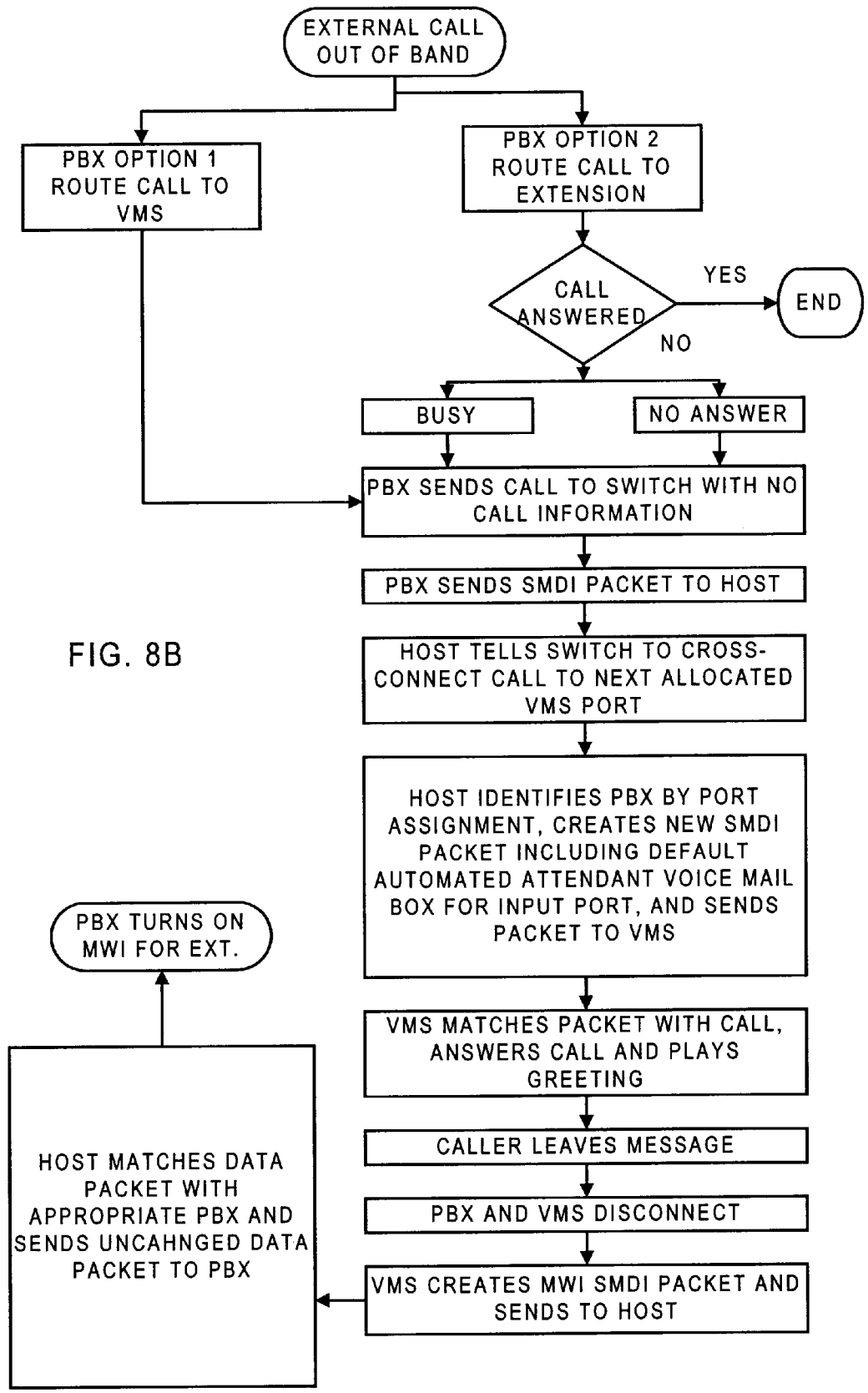
FIG. 8B is a flow diagram showing how the system handles call integration for Automated Attendant functions.
Figure 8C:
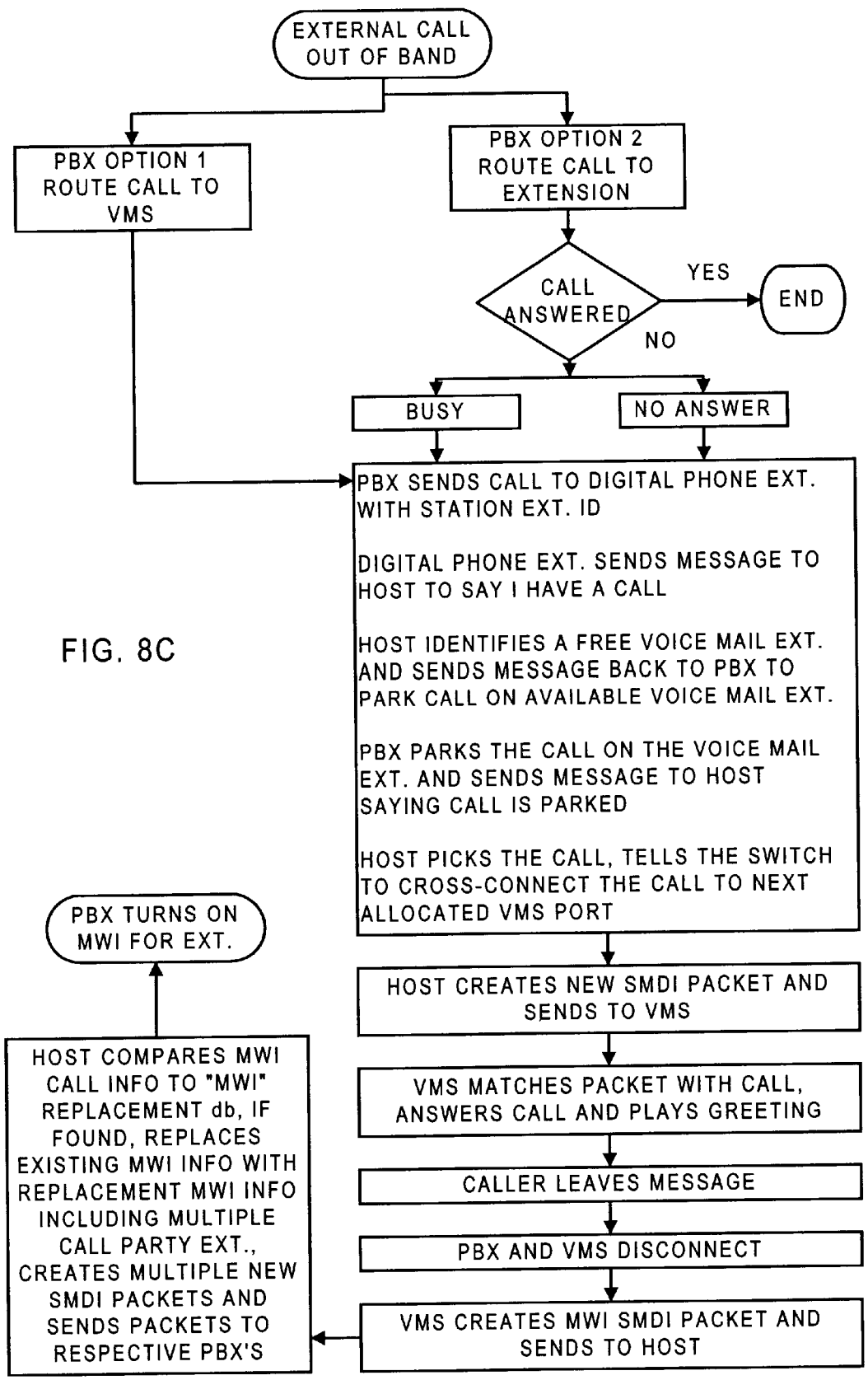
FIG. 8C is a flow diagram showing how the system handles call integration for park and pick integration.

Referring to FIGS. 3, 5 and 8, a specific example of the handling of an external call to out-of-band PBX 20 will be described. A caller calls a company wherein PBX 20 receives the call over trunk line 20T (FIG. 3) and the caller enters the extension number of the person being called, for example Ext. 123. According to a pre-programmed command entered by the person being called, PBX 20 can either forward the call to Ext. 123 or it can immediately forward the call to the lead voice mail extension, for example Ext. 500. If the call is forwarded to Extension 123, and the call is answered, the process is ended before reaching the apparatus 12. If the Extension 123 is busy or there is no answer, PBX 20 automatically forwards the call to the lead voice mail extension, for example Ext. 500. In either scenario, when the call is forwarded to the lead voice mail extension (500), the integration device 32 extracts call information from PBX 20 which identifies the extension called, and indicates the status of the call, i.e. direct forward, busy, ring no answer, and creates an SMDI data packet to send to the switching control system. The call is then sent out through the remote multiplexor 50 along with the data packet through a private or public telephone network and into one of several local multiplexers 50 within the apparatus 12. The call itself is then sent to one of the input ports 44 while the data packet is sent to the switching control system 42. The switching control system 42 reads the data packet, matches the packet with the call, determines the next available voice mail port 46, and creates a new SMDI data packet which it substitutes for the original packet. The new SMDI data packet is sent to the voice mail system 22, the call is cross-connected to the allocated voice mail port 46, and the voice mail system 22 answers the call with the appropriate greeting. The caller then leaves message, and PBX 20 and voice mail system 22 disconnect. Thereafter, to light the MWI back on PBX 20, the voice mail system 22 sends an SMDI packet back to the switching control system 42. By means of same internal database, the switching control system 42 knows that PBX 20 is an out-of-band PBX, and therefore knows that it can send the SMDI packet back through the data mux 54 to the PBX.

Figure 9:
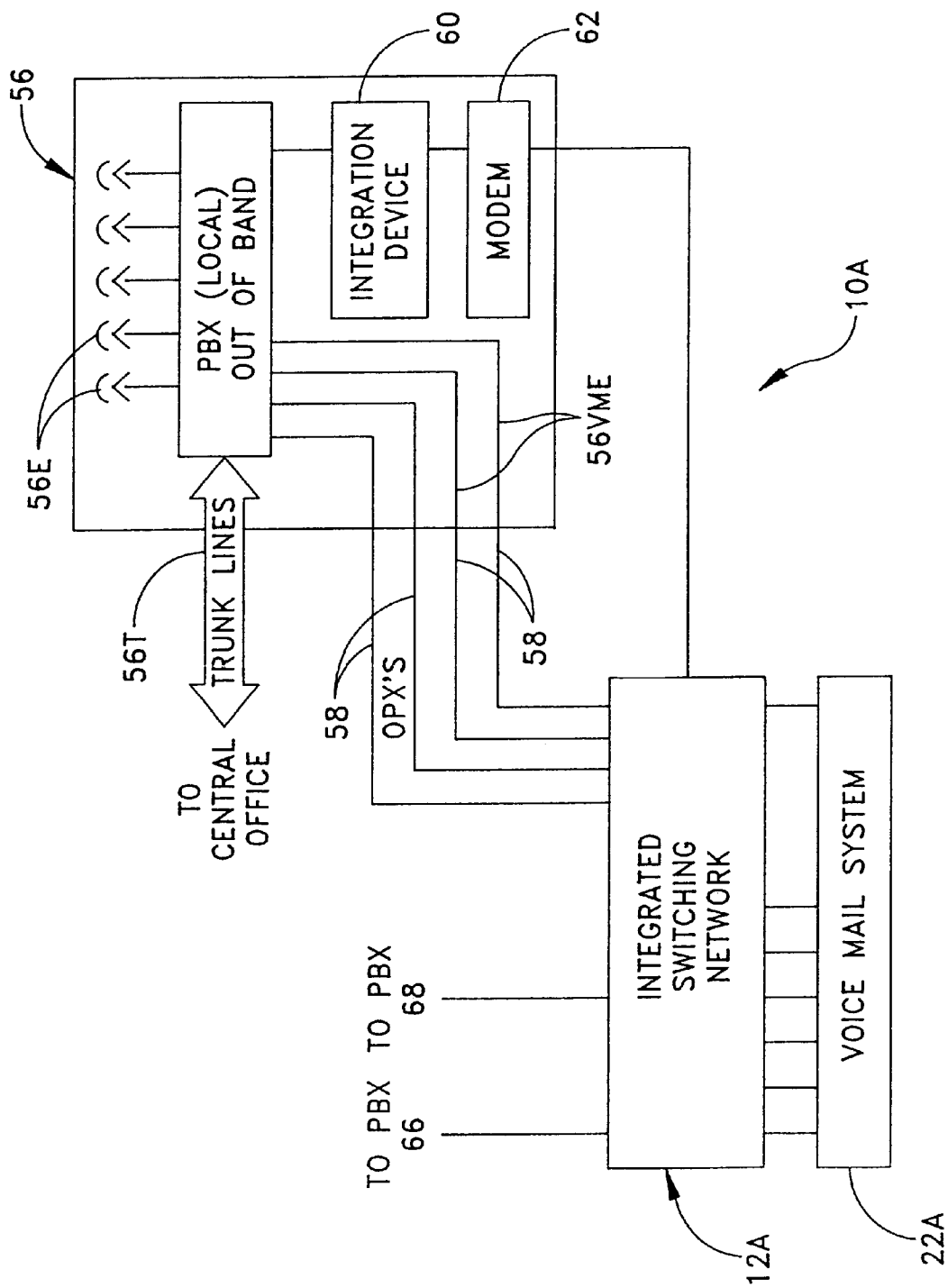
FIG. 9 is a schematic block diagram of another embodiment of an integrated telephone system utilizing off premise extension (OPX) lines and incorporating the switching apparatus of the instant invention.
Figure 10:
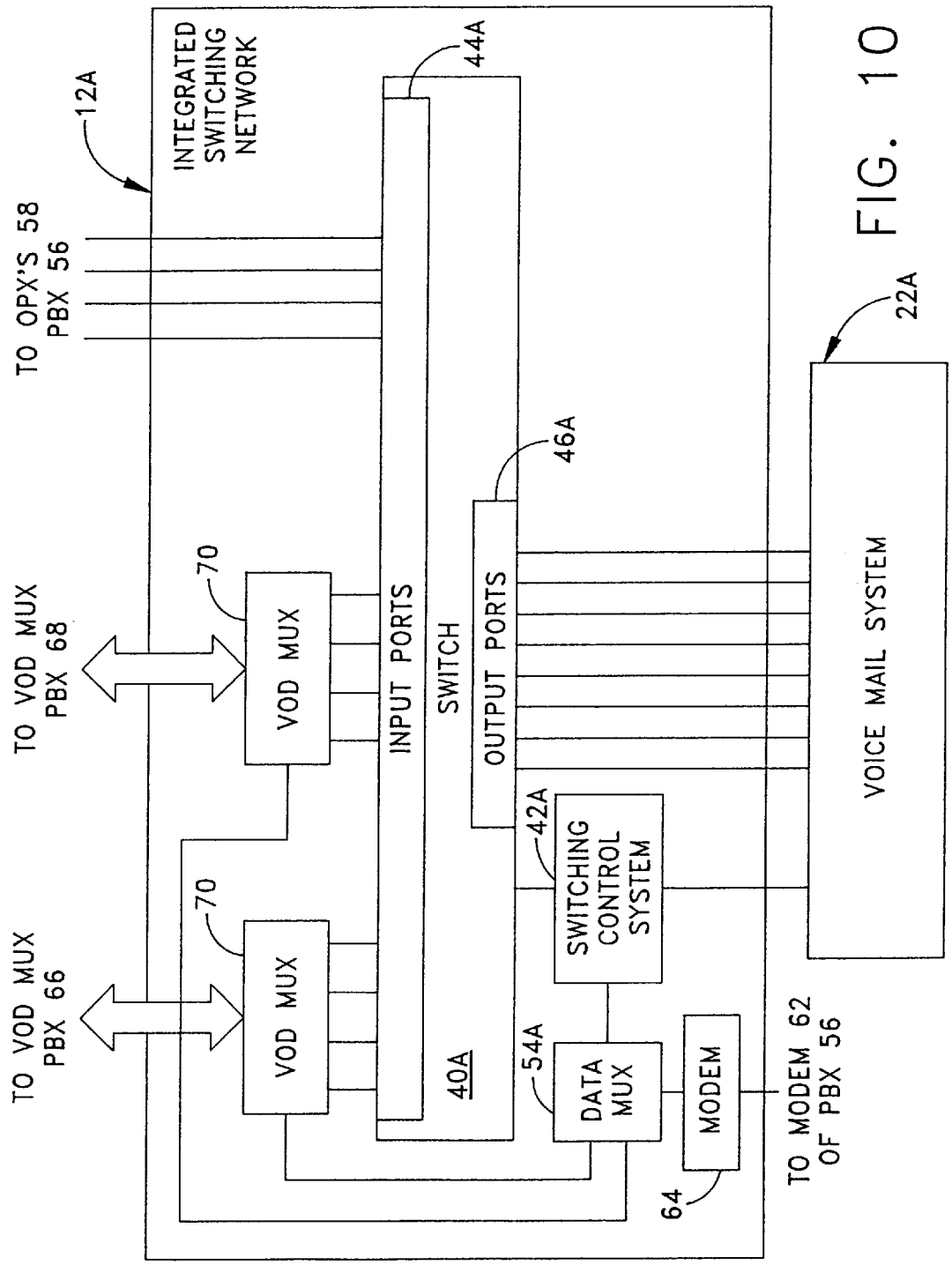
FIG. 10 is an enlarged block diagram of the integrated switching apparatus as illustrated in FIG. 9.

Referring now to FIGS. 9 and 10, an alternate embodiment of a telephone system is illustrated and generally indicated at 10A. The system 10A is illustrated to demonstrate the connection of a local off-premise PBX generally indicated at 56, and the use of off-premise extension lines 58 to connect the voice mail extensions to the switching network 12A. The PBX 56 is generally similar to PBX 20 (FIG. 3) including a trunk station for trunk lines 56T, a first telephone extension station for telephone extensions 56E, a second telephone extension station for voice mail extensions 56VME, and a digital telephone extension. The key difference in this system 10A is that the voice mail extensions 56VME are connected directly to the switch 40A by means of off-premise extension lines 58. Call information from the digital telephone extension is sent to the data mux 54A through an integration device 60, a remote modem 62 and a local modem 64 within the apparatus 12A. The system 10A functions in the same manner as system 10 except for the telephone connections to the switch 40A and data mux 54A. Other lines connected to the apparatus 12A may come in from other remote PBX's 66, 68 (not shown) through conventional voice over data multiplexers 70, 72.

It is also noted that OPX lines can also be utilized to integrate either local or remote in-band PBX's with the apparatus 12, and for that matter, OPX lines can generally be substituted for any connection between the PBX and the apparatus 12.

It can therefore be seen that the. instant integrated switching apparatus 12 provides an effective mechanism for interconnecting multiple PBX's 14, 16, 18 and 20 to a single voice mail system 22. The integrated switching apparatus takes all the incoming calls from the multiple PBX's, and dynamically directs the calls to the voice mail system with full integration of all call information and services, including messages, message waiting indicators, automated attendant, and transfer to live operators. The apparatus provides the unique ability and the attendant advantages of having a single voice mail system for multiple telephone systems. Accordingly, there is no longer any need to install and maintain multiple, redundantly oversized, voice mail systems at multiple locations. Huge savings in initial equipment costs and further savings in administrative operating costs are achieved while enhancing functionality instead of compromising functionality. Furthermore, the fact that every branch exchange is connected to the same voice mail system eliminates toll calling between separate voice mail systems to exchange messages while also providing instantaneous access to voice mail messages no matter where the voice message originated. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method of fully integrating a single voice mail box for different station extensions on a PBX, said method comprising the steps of:

providing an integration apparatus connected between said PBX and a voice mail system, said integration apparatus including a switching apparatus having a plurality of input ports connected to voice mail extensions on said PBX, a plurality of output ports connected to a plurality of voice mail ports of said voice mail system, and a switching circuit interconnecting the input ports to the output ports for selectively cross-connecting calls from said input ports to said output ports, said integration apparatus further including a switching control apparatus coupled to said switching apparatus for selectively controlling cross-connecting of said calls from said input ports to said output ports;

receiving a call on said PBX;

automatically generating and communicating a set of call information directly from said PBX to said switching control apparatus, said call information identifying at least the called party extension and a respective PBX voice mail extension to which the call is being forwarded;

comparing said called party extension to a mail box replacement database in said switching control apparatus, said mail box replacement database including the called party extension and a replacement voice mail box extension to use as a replacement for the called party extension;

replacing said called party extension with said replacement voice mail box extension;

determining an available voice mail port;

creating a new set of call information for said call, said new set of call information identifying said replacement voice mail box extension, and further identifying a respective voice mail port to which the call is being cross-connected;

communicating said new set of call information to said voice mail system to identify said call to said voice mail system;

cross-connecting said call from said input port to said available output port;

providing a personalized greeting associated with said called party extension; and receiving a voice mail message from the calling party.

2. The method of claim 1 wherein said call information is communicated in SMDI data packet format.

3. The method of claim 1 wherein said call information is communicated in in-band format.

4. The method of claim 1 wherein said call information further includes a call type identifier, and said mailbox replacement database further includes a replacement call type identifier, said method further comprising the step of replacing said call type identifier with said replacement call type identifier wherein said new set of call information includes said replacement call type identifier.

5. The method of claim 1 further comprising the steps of activating a message waiting indicator (MWI) on the called party extension.

6. The method of claim 5 further comprising the steps of:

communicating a set of MWI call information from said voice mail system to said integration apparatus, said MWI call information including the replacement voice mail box extension;

comparing said replacement voice mail box extension to an MWI replacement database in said switching control apparatus, said MWI replacement database including said voice mail box extension and a plurality of called party extensions to use as replacements for the voice mail box extension;

creating a plurality of new set of MWI call information, each new set of MWI call information including one of said plurality of called party extensions;

communicating said new sets of MWI call information directly from said integration apparatus to said PBX, wherein said PBX activates MWI's for each of said called party extensions.

7. A method of fully integrating a single voice mail box for different station extensions on a plurality of different PBX's, said method comprising the steps of:

providing an integration apparatus connected between said different PBX's and a single voice mail system, said integration apparatus including a switching apparatus having a plurality of input ports connected to voice mail extensions on each of said plurality of different PBX's, a plurality of output ports connected to a plurality of voice mail ports of said single voice mail system, and a switching circuit interconnecting the input ports to the output ports for selectively cross-connecting calls from said input ports to said output ports, said integration apparatus further including a switching control apparatus coupled to said switching apparatus for selectively controlling cross-connecting of said calls from said input ports to said output ports;

receiving a call on one of said plurality of PBX's;

automatically generating and communicating a set of call information directly from said PBX to said switching control apparatus, said call information identifying at least the called party extension and a respective PBX voice mail extension to which the call is being forwarded;

determining which PBX said call originated from;

comparing said called party extension to a mail box replacement database in said switching control apparatus, said mail box replacement database including the called party extension and a replacement voice mail box extension to use as a replacement for the called party extension;

replacing said called party extension with said replacement voice mail box extension;

determining an available voice mail port;

creating a new set of call information for said call, said new set of call information identifying at least the called party by PBX and said replacement voice mail box extension, and further identifying a respective voice mail port to which the call is being cross-connected;

communicating said new set of call information to said voice mail system to identify said call to said voice mail system;

cross-connecting said call from said input port to said available output port;

providing a personalized greeting associated with said called party extension; and receiving a voice mail message from the calling party.

8. The method of claim 7 wherein said call information is communicated in SMDI data packet format.

9. The method of claim 7 wherein said call information is communicated in in-band format.

10. The method of claim 7 wherein said call information further includes a call type identifier, and said mailbox replacement database further includes a replacement call type identifier, said method further comprising the step of replacing said call type identifier with said replacement call type identifier wherein said new set of call information includes said replacement call type identifier.

11. The method of claim 7 further comprising the steps of activating a message waiting indicator (MWI) on the called party extension.

12. The method of claim 11 further comprising the steps of:

communicating a set of MWI call information from said voice mail system to said integration apparatus, said MWI call information including the replacement voice mail box extension for which the MWI data packet was created;

comparing said replacement voice mail box extension to an MWI replacement database in said switching control apparatus, said MWI replacement database including said voice mail box extension and a plurality of called party extensions to use as replacements for the voice mail box extension;

replacing said voice mail box extension with said plurality of called party extensions;

creating a plurality of new sets of MWI call information, each set of MWI call information including one of said plurality of called party extensions; and communicating said new sets of MWI call information directly from said integration apparatus to said plurality of receiving PBX's.

13. A method of fully integrating message waiting indicators from a single voice mail box to different station extensions on a PBX, said method comprising the steps of:

providing an integration apparatus connected between said PBX and a voice mail system, said integration apparatus including a switching apparatus having a plurality of input ports connected to voice mail extensions on said PBX, a plurality of output ports connected to a plurality of voice mail ports of said voice mail system, and a switching circuit interconnecting the input ports to the output ports for selectively cross-connecting calls from said input ports to said output ports, said integration apparatus further including a switching control apparatus coupled to said switching apparatus for selectively controlling cross-connecting of said calls from said input ports to said output ports;

communicating a single set of MWI call information from said voice mail system to said integration apparatus, said MWI call information identifying a single voice mail box extension for which the MWI call information was created;

comparing said voice mail box extension to an MWI replacement database in said switching control apparatus, said MWI replacement database including said voice mail box extension and a plurality of called party extensions to use as replacements for the voice mail box extension;

replacing said voice mail box extension with said plurality of called party extensions;

creating a plurality of new sets of MWI call information, each new set of MWI call information including one of said plurality of called party extensions; and communicating said new sets of MWI call information directly from said integration apparatus to said PBX.

14. A method of fully integrating message waiting indicators from a single voice mail box to different station extensions on a plurality of different PBX's, said method comprising the steps of:

providing an integration apparatus connected between said different PBX's and a single voice mail system, said integration apparatus including a switching apparatus having a plurality of input ports connected to voice mail extensions on each of said plurality of different PBX's, a plurality of output ports connected to a plurality of voice mail ports of said single voice mail system, and a switching circuit interconnecting the input ports to the output ports for selectively cross-connecting calls from said input ports to said output ports, said integration apparatus further including a switching control apparatus coupled to said switching apparatus for selectively controlling cross-connecting of said calls from said input ports to said output ports;

communicating a single set of MWI call information from said voice mail system to said integration apparatus, said MWI call information identifying a single voice mail box extension for which the MWI call information was created;

comparing said voice mail box extension to an MWI replacement database in said switching control apparatus, said MWI replacement database including said voice mail box extension and a plurality of called party extensions to use as replacements for the voice mail box extension;

replacing said voice mail box extension with said plurality of called party extensions;

creating a plurality of new sets of MWI call information, each new set of MWI call information including one of said plurality of called party extensions; and communicating said new sets of MWI call information directly from said integration apparatus respectively to said plurality of PBX's.

15. A method of fully integrating automated attendant functions for a plurality of different PBX's, said method comprising the steps of:

providing a single voice mail system;

providing an integration apparatus connected between said different PBX's and said single voice mail system, said integration apparatus including a switching apparatus having a plurality of input ports connected to voice mail extensions on each of said plurality of different PBX's, a plurality of output ports connected to a plurality of voice mail ports of said single voice mail system, and a switching circuit interconnecting the input ports to the output ports, said integration apparatus further including a switching control apparatus coupled to said switching apparatus for selectively cross-connecting said calls from said input ports to said output ports, providing said voice mail system with an automated attendant voice mail box for each of said plurality of PBX's;

identifying said automated attendant voice mail boxes as default voice mail boxes associated with respective voice mail extensions of said respective PBX's;

receiving a call on one of said plurality of PBX's;

determining which PBX said call originated from using said input port assignments in said database;

determining an available voice mail port;

automatically creating a set of call information for said call wherein said new set of call information identifies the automated attendant voice mail box for the PBX from which the call is being forwarded, and further identifying a respective voice mail port to which the call is being cross-connected;

communicating said new set of call information to said voice mail system to identify said call to said voice mail system;

cross-connecting said call from said input port to said available output port; and using said automated attendant voice mail box to provide a personalized automated attendant greeting associated with said PBX.

16. A method of providing park and pick call integration between a PBX and a voice mail system, said method comprising the steps of:

providing an integration apparatus connected between said PBX and said voice mail system, said PBX including a digital telephone extension which received calls to be transferred to the voice mail system, said integration apparatus including a switching apparatus having a plurality of input ports connected to voice mail extensions of said PBX, a plurality of output ports connected to a plurality of voice mail ports of said voice mail system, and a switching circuit interconnecting the input ports to the output ports, said integration apparatus further including a switching control apparatus coupled to said switching apparatus for selectively cross-connecting said calls from said input ports to said output ports;

receiving a set of call information from said digital telephone extension of said PBX, said call information identifying at least the called party extension;

determining an available voice mail extension of said PBX;

instructing said PBX to park said call;

parking said call;

picking said parked call using said available voice mail extension;

determining an available voice mail port;

creating a new set of call information for said call, said new set of call information identifying at least the called party by PBX and further identifying a respective voice mail port to which the call is being cross-connected;

communicating said new set of call information to said voice mail system to identify said call to said voice mail system;

cross-connecting said call from said input port to said available output port;

providing a personalized greeting associated with said called party extension; and receiving a voice mail message from the calling party.

* * * * *